No. 751,633.                                                                 Patented February 9, 1904.

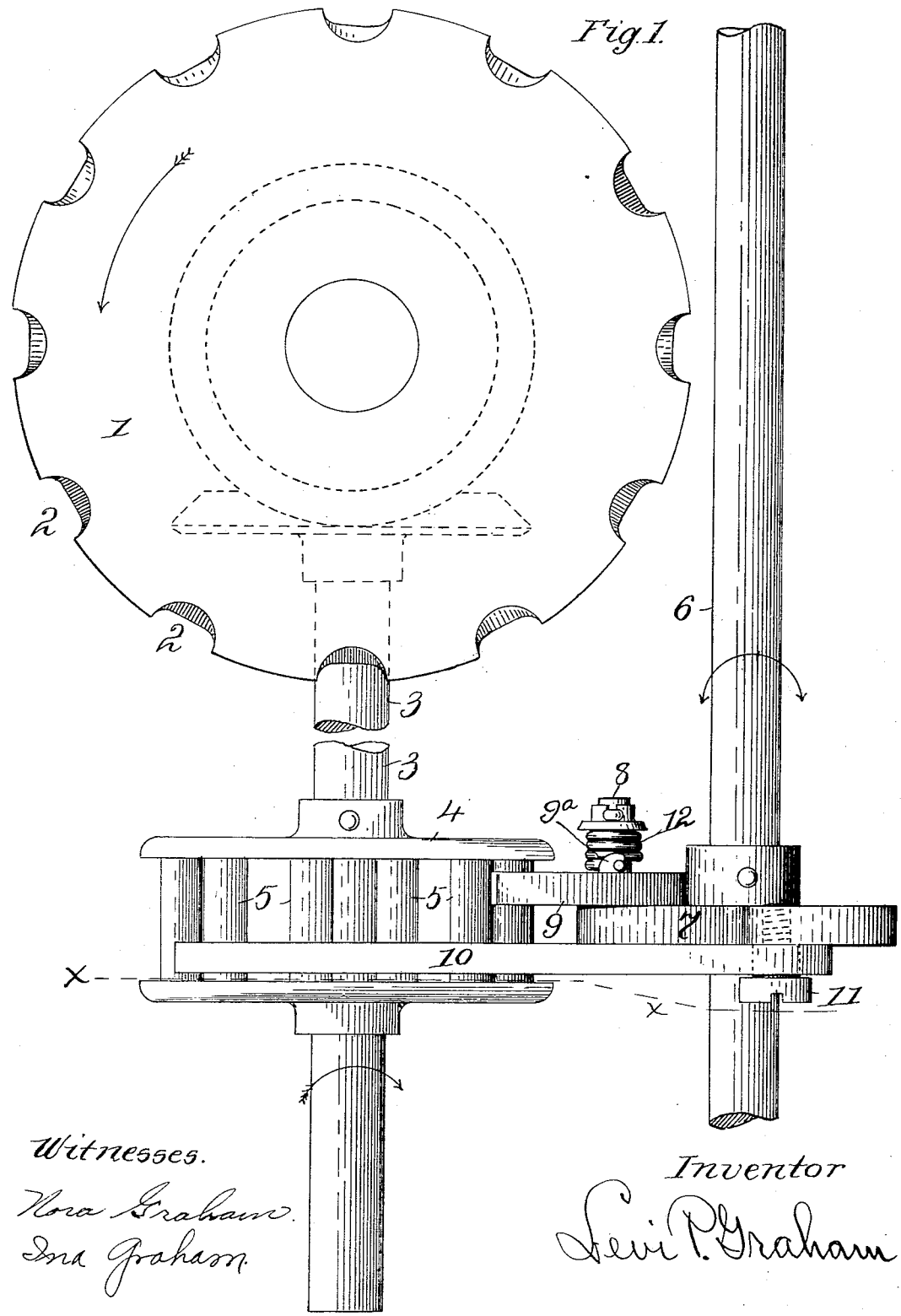

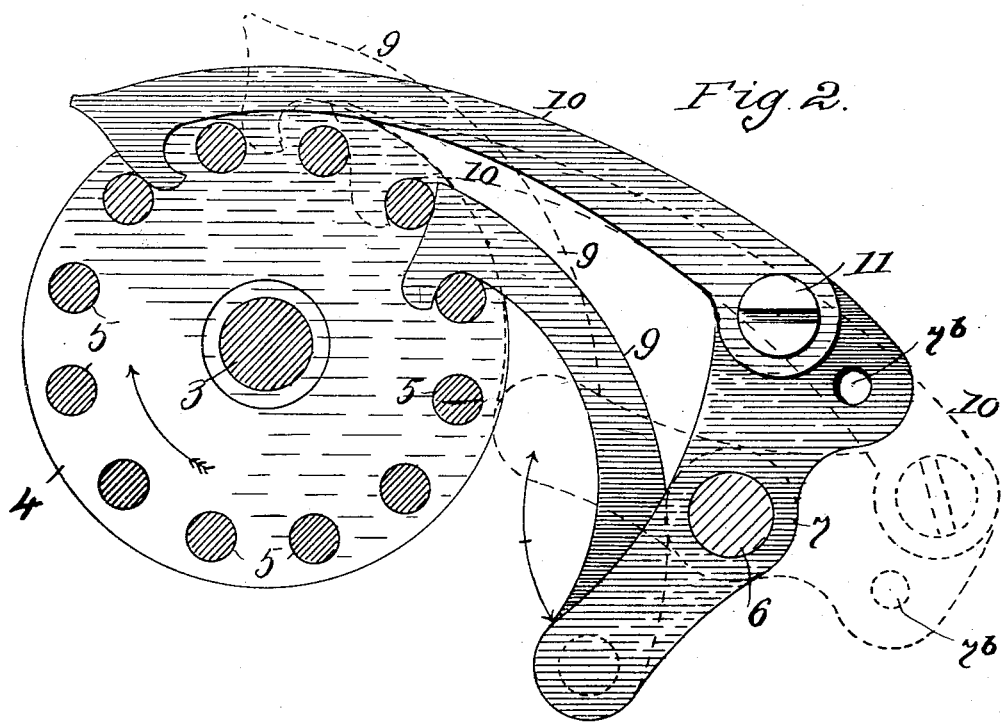
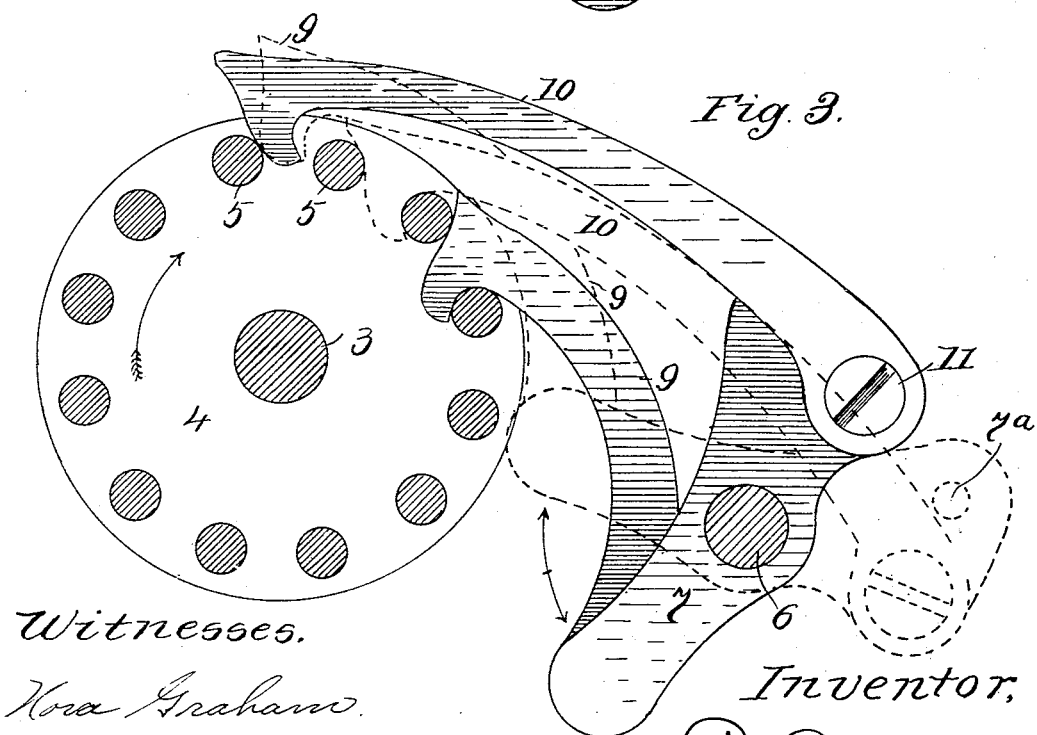

UNITED STATES PATENT OFFICE.

LEVI P. GRAHAM, OF DECATUR, ILLINOIS.

CORN-PLANTER.

SPECIFICATION forming part of Letters Patent No. 751,633, dated February 9, 1904.

Application filed October 26, 1903. Serial No. 178,607. (No model.)

*To all whom it may concern:*

Be it known that I, LEVI P. GRAHAM, of the city of Decatur, county of Macon, and State of Illinois, have invented certain new and useful Improvements in Corn-Planters, of which the following is a specification.

This invention relates to planters in which the seed-plates have cells each adapted to hold a single grain of corn and in which the check-row shaft is rocked backward and forward at each operation.

The invention is particularly applicable to the planter-movement described in Letters Patent of the United States No. 727,539, issued to me May 5, 1903, in which motion is imparted to the seed-plates during both the backward and the forward movement of the check-row shaft; and the object is to enable either four grains, three grains, or two grains to be dropped from one plate without manipulating the plate or opening the seedbox.

In the drawings forming part of this specification, Figure 1 is a plan of so much of a planter as is needed to explain this particular invention, and Figs. 2 and 3 are each a cross-section on line X in Fig. 1. The cross-sections illustrate the mechanism used to drive the seed-plate from the rocking motion of the check-row shaft, and Fig. 2 shows how four grains may be dropped for each hill, while Fig. 3 shows the drive-gear adjusted to drop three grains for a hill.

The seed-plate 1 has a plurality of seed-cells 2, twelve in this instance, and the cells are preferably formed in the perimeter of the plate, as shown. A drill-shaft 3 is geared to the seed-plate, as shown by dotted lines in Fig. 1, and the speed of rotation of the seed-plate is the same as that of the drill-shaft. A ratchet-wheel 4 is fastened onto the drill-shaft, and as a matter of preference the ratchet-wheel is of the lantern type, with rungs for teeth. The number of rungs or teeth in the ratchet-wheel is the same as the number of cells in the seed-plate.

A check-row shaft is shown at 6, and a cross-arm 7 is fastened onto the check-row shaft. The cross-arm extends in two directions and is therefore virtually two arms. A pawl 9 is pivotally connected with the downward and backward extension of arm 7, and another pawl, 10, is pivotally connected with the upward and forward extension of the arm. Pawl 9 extends upward into engagement with the ratchet-wheel, while pawl 10 extends more nearly backward. Both pawls impart motion to the ratchet-wheel in the same direction; but pawl 10 acts on the ratchet-wheel as the check-row shaft rocks forward, while pawl 9 acts on the ratchet-wheel as the check-row shaft rocks backward.

The pawl 9 is pivoted on a pin 8, extending from a side of the lower end of arm 7, and a spring 12 bears against a lug $9^a$ on a side of the pawl and holds the pawl to its work. The upper extension of arm 7 has two pivot-points, one at $7^a$ and the other at $7^b$, and from either of these points the pawl 10 may swing. In this instance a screw 11 forms the pivot for the pawl 10, and the points $7^a$ and $7^b$ are bored and threaded to receive the screw.

The check-row shaft is rocked a distance sufficient to carry arm 7 from the position shown in solid lines to the position shown in broken lines and back again. A forward-and-back or backward-and-forward movement of the check-row shaft constitutes a complete operation, and the movement of pawl 9 is always sufficient to advance the ratchet-wheel two rungs or teeth and to advance the seed-plate two cells.

When the pawl 10 is pivoted at point $7^a$, as shown in Fig. 2, it will move far enough to advance the ratchet-wheel two teeth at each complete operation, and when it is pivoted at point $7^b$, as shown in Fig. 3, it will advance the ratchet-wheel but one tooth at each forward-and-back movement.

The check-row shaft is rocked forward and backward by any suitable means, and a complete oscillation or forward-and-back movement constitutes a hill-dropping operation. When it is desired to drop four grains for each hill, the pawl 10 is pivoted at point $7^a$ on arm 7 and the two-cell movement of pawl 10 plus the two-cell movement of pawl 9 gives the four grains required. In order to drop three grains for each hill, the pawl 10 is pivoted at point $7^b$ on arm 7 and the one-cell advancement made by pawl 10 under these conditions is added to the invariable two-cell advancement of pawl 9. To drop two grains in each hill, the pawl 10 is simply put out of operation entirely.

It will be understood that the seed-plate is to operate in a seedbox the side wall of which will close the open sides of the cells, that two seed-plates are commonly used in a planter, and that second drop mechanism, carrying-wheels, and a great deal of other mechanism is needed to make a complete planter. My invention begins with a rocking check-row shaft and ends with a rotating seed-plate having a plurality of single-grain cells. Consequently my description is limited to so much of a planter as is needed to explain my invention.

I claim—

1. In a corn-planter, the combination of a ratchet-wheel, a seed-plate partaking of the motion of the ratchet-wheel and having as many single-grain seed-cells as the ratchet-wheel has teeth, a rocking check-row shaft, means for advancing the ratchet-wheel an invariable number of teeth through the rock of the shaft in one direction and means for advancing the ratchet-wheel a variable number of teeth through the rock of the check-row shaft in the contrary direction.

2. In a planter, the combination of a seed-plate having a plurality of single-grain seed-cells, a ratchet-wheel having as many teeth as the seed-plate has cells, a rocking check-row shaft, a pawl carried by the check-row shaft and adapted to advance the ratchet-wheel an invariable number of teeth as the check-row shaft is rocked in one direction, an adjustable pawl carried by the check-row shaft and adapted to advance the ratchet-wheel a variable number of teeth as the check-row shaft is rocked in the opposite direction, and means for transmitting the motion of the ratchet-wheel to the seed-plate.

In testimony whereof I sign my name in the presence of two subscribing witnesses.

LEVI P. GRAHAM.

Witnesses:
 INA GRAHAM,
 NORA GRAHAM.